5 Sheets—Sheet 1
E. J. JERZMANOWSKI.
Apparatus for the Manufacture of Gas.
No. 199,912. Patented Feb. 5, 1878.
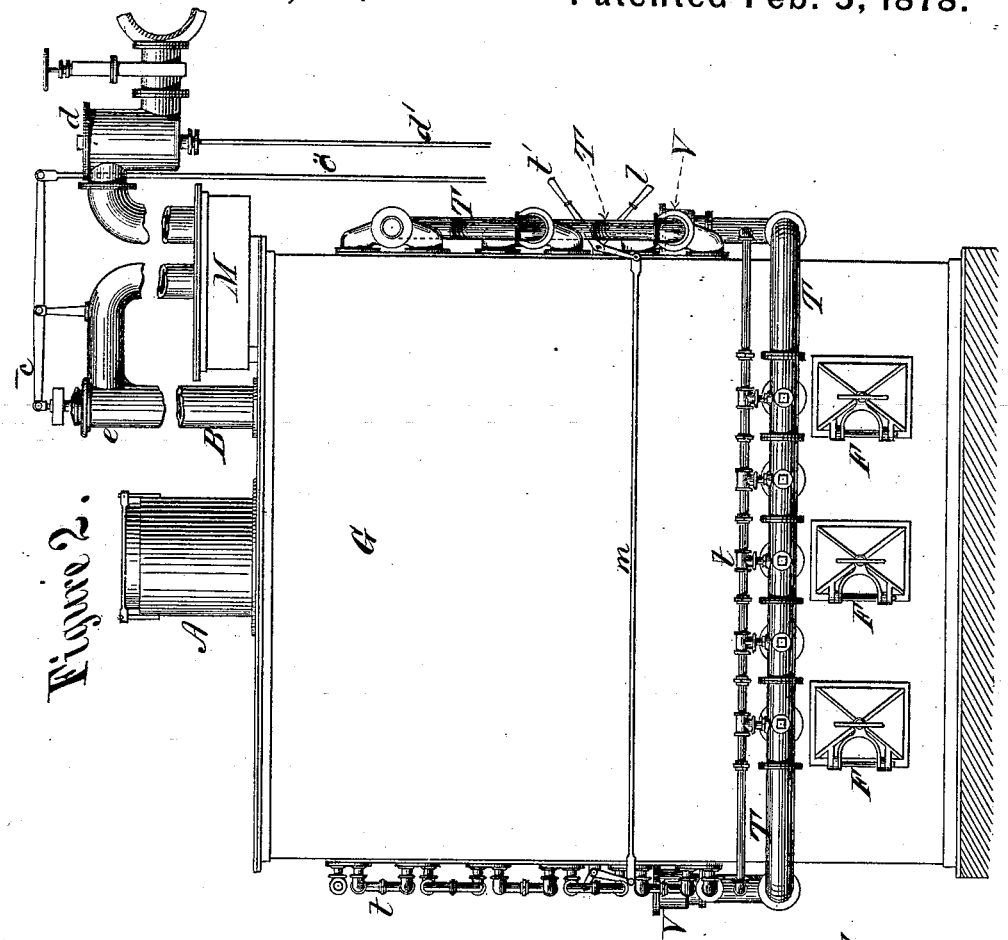
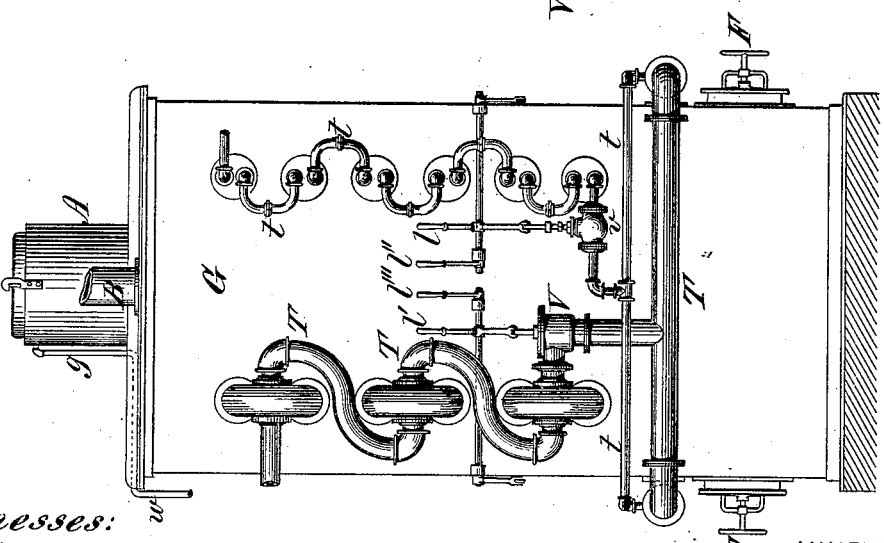

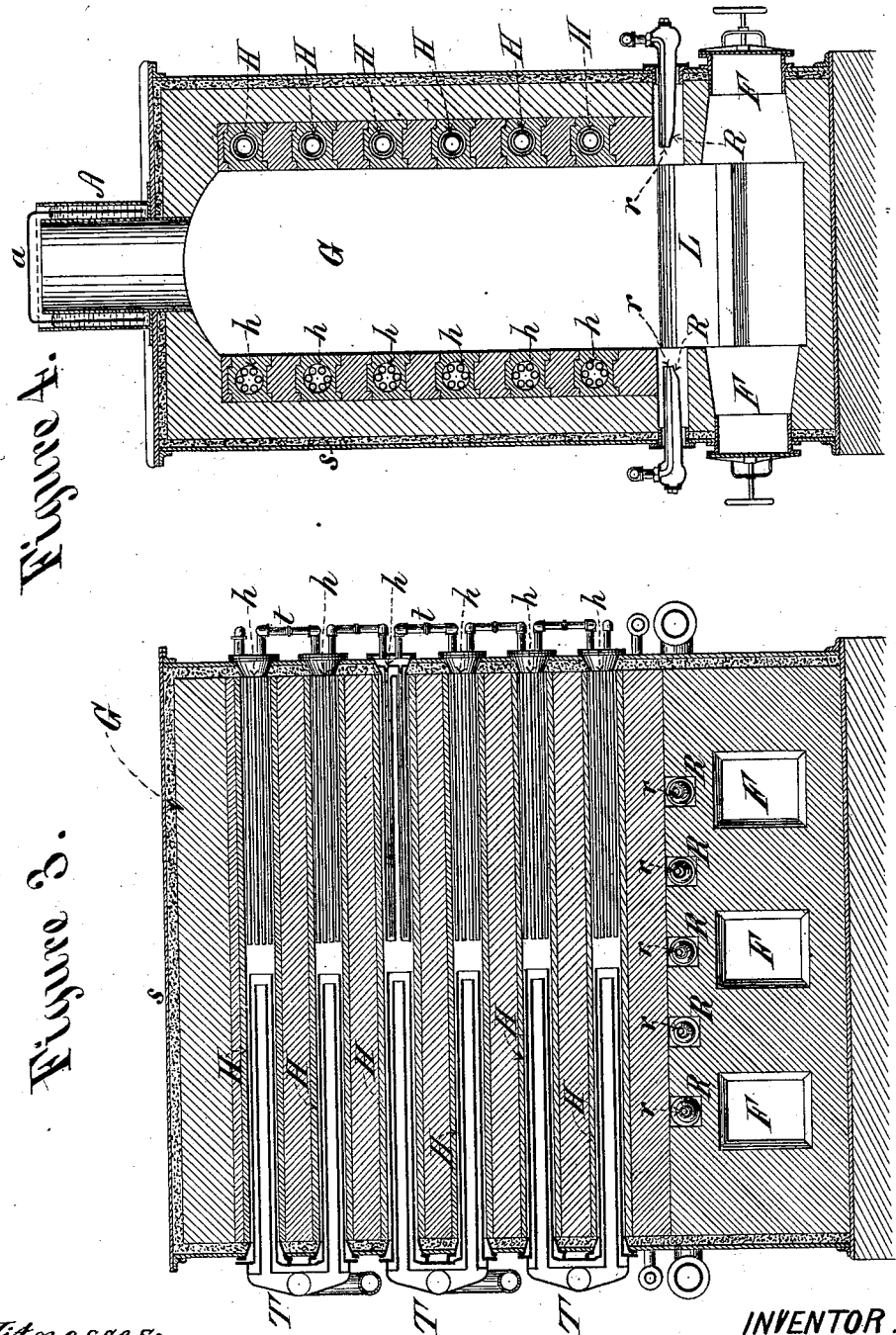

E. J. JERZMANOWSKI.
Apparatus for the Manufacture of Gas.
No. 199,912. Patented Feb. 5, 1878.

5 Sheets—Sheet 4.
E. J. JERZMANOWSKI.
Apparatus for the Manufacture of Gas.
No. 199,912. Patented Feb. 5, 1878.
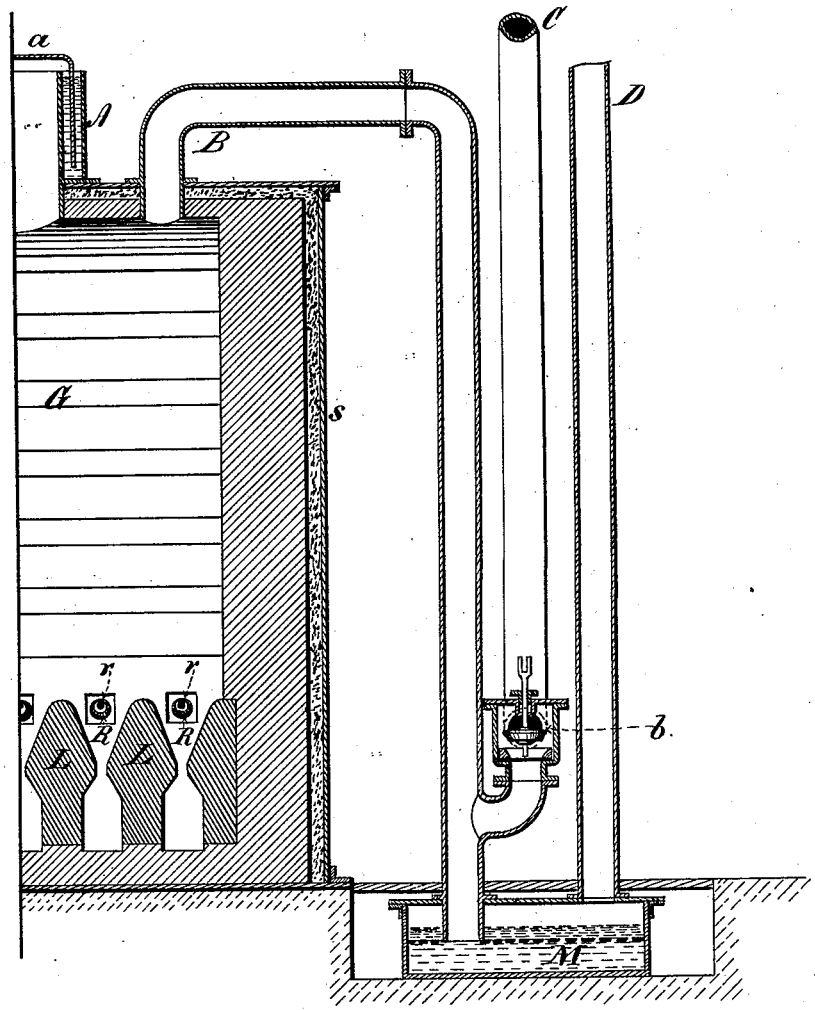

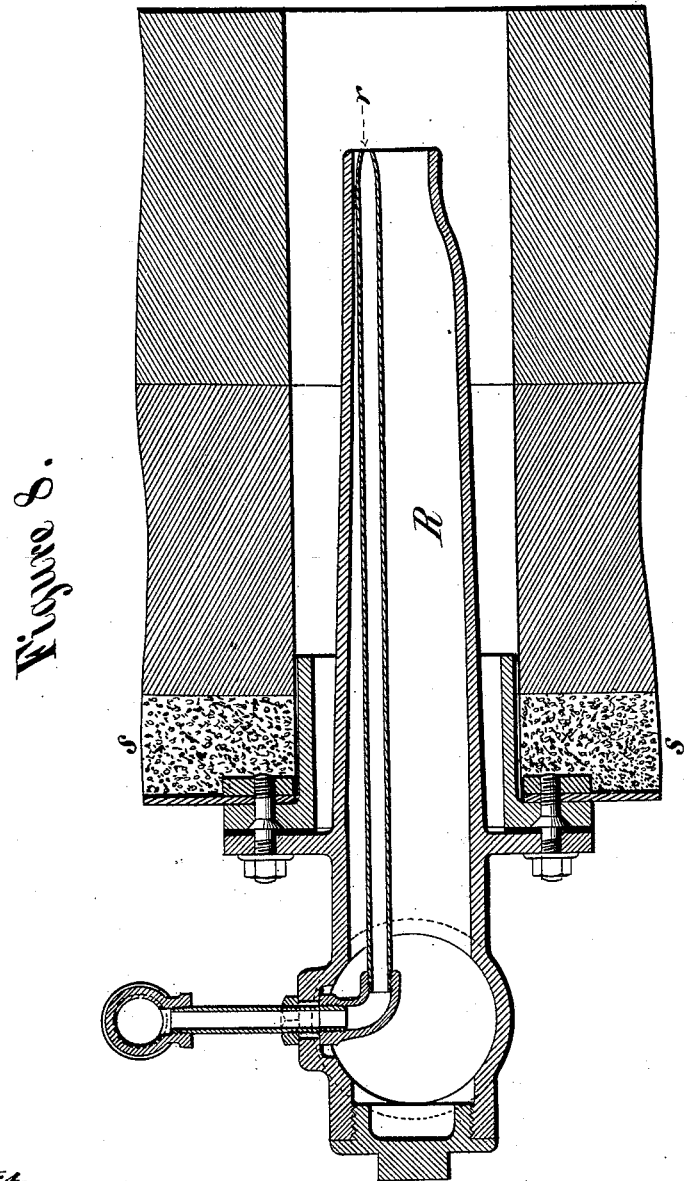

UNITED STATES PATENT OFFICE.

ERAZM J. JERZMANOWSKI, OF NEW YORK, N. Y.

IMPROVEMENT IN APPARATUS FOR THE MANUFACTURE OF GAS.

Specification forming part of Letters Patent No. 199,912, dated February 5, 1878; application filed August 20, 1877.

*To all whom it may concern:*

Be it known that I, ERAZM J. JERZMANOWSKI, of the city of New York, State of New York, have invented certain new and useful Improvements in Apparatus for the Manufacture of Gases for Heating, Illuminating, and other purposes, of which the following is a full, true, and exact description, reference being had to the accompanying drawings.

The object of my invention is to make a simple and yet effective apparatus for the production of illuminating and other gases, especially that which is known as "water-gas," which gas is the result of the decomposition of water when in the shape of steam, due to its immediate contact with a highly-heated incandescent substance, such as coal. I have heretofore taken out a patent for an apparatus intended to accomplish this result, which patent is dated the 23d of May, 1876, and numbered 177,721. My present apparatus is an improvement upon the one there patented to me, with several important variations; and it consists generally of the gas-generator or gasogene, which is a retort or chamber filled with the incandescent substance which produces the water-gas. In the walls of this are situated a series of superheaters, for the purpose of superheating the steam and air which are employed in the manufacture of the gas. These superheaters are kept entirely distinct throughout their entire extent; and, until the entry of the steam and air into the retort or chamber, they do not come in contact, and are maintained at different pressures, the advantages of which will be hereinafter explained. I have also greatly simplified the process by reducing the number of valves necessary, and have arranged the connections in a more convenient way.

Similar letters of reference indicate similar parts in all my drawings.

Figure 5:
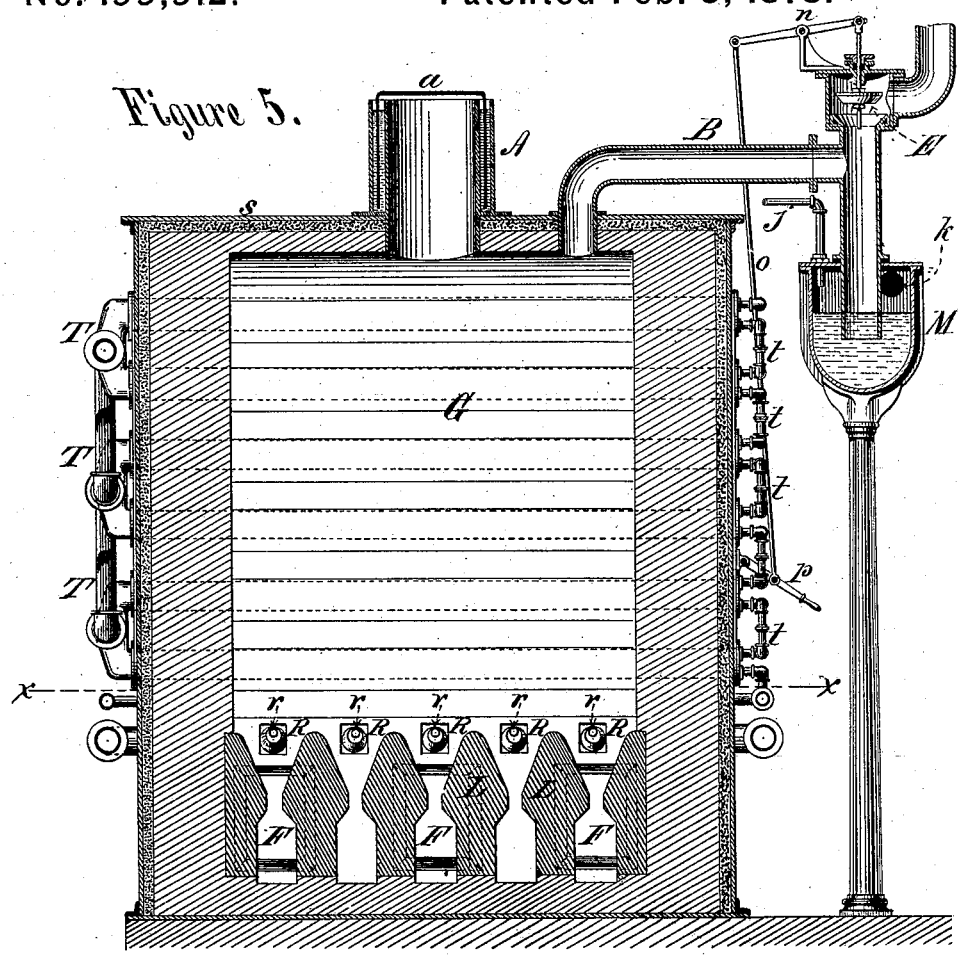
Figure 6:
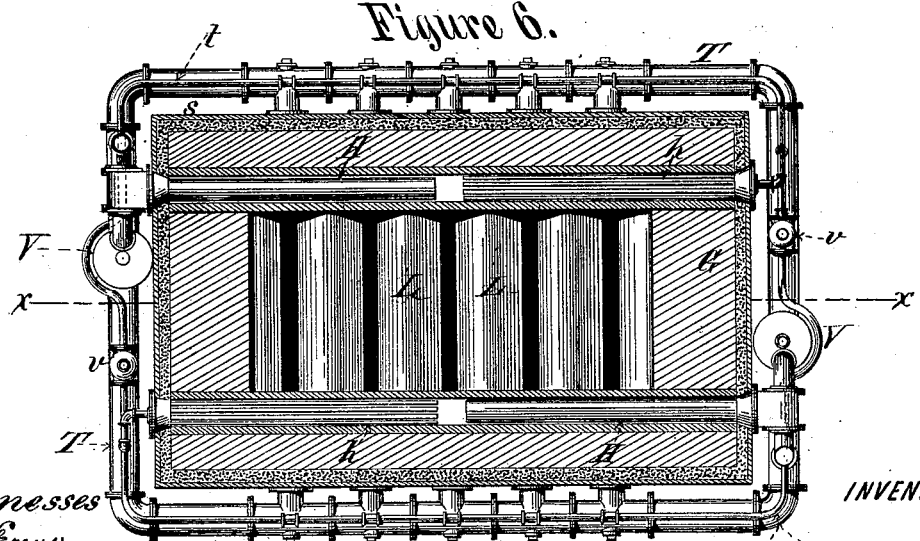

Figure 1 represents an end elevation, showing the connections of the superheaters, and showing the handles for operating the valves. Fig. 2 represents a side elevation of my apparatus, showing the connections of the tuyeres and the back connections for operating the steam and air valves; also, the connections of one form of my apparatus for purging and for allowing the passage of the gas into the gas-holder. Fig. 3 represents a cross-section through the side of my apparatus, showing the steam and air superheaters in position. Fig, 4 represents a lateral cross-section through the same, showing the tuyeres in section, and also the superheating-pipes. A gas-tight valve for admitting the coal is also shown. Fig. 5 is a cross-section of my apparatus, showing another and the simplest form of valve for purging and for admitting the gas to the gas-holder. Fig. 6 is a cross-section through Fig. 5 on the line $x\ x$. Fig. 5 is a cross-section through Fig. 6 on the line $x\ x$. Fig. 7 represents another modification of my apparatus, showing the detail of the valves. Fig. 8 is a larger cross-section view of my improved tuyeres.

In the manufacture of this gas it is necessary to constantly replenish the supply of fuel which is being withdrawn from the bottom of the gas-generating chamber; and, in order that this may be readily accomplished, I place a gas-tight valve (shown at A in my figures) on top of the generator, which consists of an annular cup, which is filled with water by means of a pipe not here shown, which water is let off at the proper height by means of the pipe $g$, Fig. 1. Into this annular water-chamber a corresponding inverted metallic cup, $a$, Fig. 4, is dropped. As this passes beneath the surface of the water it makes an absolutely gas-tight joint, while at the same time it is readily removed for the purpose of charging the gas-generating chamber. I usually employ a small derrick for the purpose of removing this cup or cover.

G represents generally my gas-generating chamber. In the walls of this are fitted superheaters H and $h$, which superheaters, respectively, are used to heat air and steam. The larger superheaters, H, have a corresponding set of smaller superheaters, $h$, on the opposite side of the apparatus, as is shown in cross-section in Fig. 4.

In Fig. 1 it will be observed that the steam-superheaters are all connected, by means of the connecting-pipes $t$, to the valves $v$, which are controlled by means of the lever $l$. This lever $l$ serves to open and close the valves $v$, and thereby allows the passage of the superheated steam to the pipe $t$, whence it passes to the smaller tuyeres, which I shall hereinafter describe. The air which has been superheated in the larger superheaters H is carried, by means of a connecting-pipe, T, to the valve V, controlled by the lever $l'$, Fig. 1; then, by means of the pipe T, to the larger tuyeres. A corresponding set of steam and air superheaters are fitted in the walls of the back part of the chamber G, and are controlled by means of the levers $l''$ $l''$ and the connecting-rods $m$, as is clearly shown in Figs. 1 and 2. In the lower part of the combustion-chamber are fitted the double tuyeres R, which are shown in detail in Fig. 8. Through the outer tube there passes a small inner tube, $r$, which is connected to the steam-superheaters by means of the pipes $t$ and valves $v$. The purpose of this small tube is to maintain a high pressure on the steam, which cannot be accomplished if the steam were allowed to escape immediately into the large tuyeres R, for the reason that steam, in expanding, loses its heat, and thereby becomes less efficient for the purpose for which it is here employed.

In the manufacture of this gas a superheated current of air is first admitted. To continue the combustion in the generating-chamber it is necessary that the products of this combustion should escape, but that they should not pass into the gas-holder. The apparatus shown in Figs. 2, 5, and 7 is intended to accomplish this result.

After a proper combustion has been reached and the entire mass is in an incandescent state, superheated steam is admitted into the chamber, which is filled with the products of the reaction between the heated air and the burning fuel contained therein. The products of this combustion are generally nitrogen, carbonic acid, and carbonic oxide, and these should be driven out of the chamber before the gas is allowed to enter the gas-holder, and this is what is known as purging the gas-generating chamber.

In the apparatus shown in Fig. 2 the valve $e$ is first elevated by the levers $c$ and $c'$, and then superheated air from one set of superheaters is admitted to the chamber. The products of this combustion pass off by means of the valve $e$. Subsequently the air is shut off and steam is admitted. The superheated steam, thus admitted, serves to drive off the remaining products of the combustion and thoroughly purge the chamber, and then the valve $e$ is closed. The only escape remaining for the gas in the chamber G is then by means of the pipe B through the washer M, and thence through the open valve I to the gas-holder.

In Fig. 7 the valve $b$ is first opened, which allows the escape of the products of combustion through the pipe C, and also allows the steam to purge thoroughly the chamber. Subsequently the gas, passing through the pipe B, reaches the washer M, and, as soon as the valve $b$ is closed it is obliged to pass through the water, and leave the apparatus by the pipe D.

In Fig. 5 is shown what I consider to be the best form of apparatus. The pipe B has connected to it a valve, E, controlled by the lever $n$, rod $o$, and lever $p$. This valve being opened, superheated air is admitted by the valve $r$, the combustion is started, and its product escapes by the valve E. Subsequently steam is admitted by the valve $r$, and the valve E continues to act as a purge-valve, and allows the escape of the injurious impurities. Subsequently the valve E is closed, and then the gas which is formed by the reactions between the superheated steam and the incandescent coal passes through the hydraulic main M, and escapes by the pipe $k$ to the holder. The hydraulic main M is supplied with water by the pipe $j$. The gas thus formed consists principally of hydrogen, oxide of carbon, and light carbureted hydrogen, which is subsequently enriched.

By means of the apparatus shown in Fig. 5 one valve accomplishes all the results which were formerly accomplished by the use of three. This valve E is of soap-stone, as, indeed, are the other valves in my apparatus, for the reason that this material is much more capable of resisting the action of rapidly-flowing currents of superheated air and steam than any other material of which I have knowledge. I find it advantageous to use in this apparatus the form of superheaters consisting of double concentric tubes, which tubes are set into a double series of partitions in such a way that the circulating air or steam passes in succession through the inner and the outer tubes, whereby a complete circulation through all the parts of the apparatus is obtained, and the medium is forced to come in contact with the superheating surface. I find these much preferable to the ordinary form of a coil-superheater, for the reason that the pipes can be readily interchanged, and generally I prefer a double concentric pipe-superheater to a single-pipe superheater.

I insulate my gas-generating chamber by means of some insulating substance, such as sand. (Marked $s$.) By means of the double set of tuyeres which I employ here, one set is heated while the other set is being used, and I am therefore able to keep up a continuous current of superheated steam or air without waiting for the heating of these superheaters.

I do not claim in this application a soap-stone valve as being *per se* my invention, but merely its application to this particular apparatus, the said valve being the invention of Thomas F. Rowland.

I disclaim in this application the gas-tight water-cap shown in connection with the gas-cupola, having made a separate application for the same.

What I claim as my invention, and desire to secure by Letters Patent, is—

1. A gas-generating chamber, having within its walls two sets of superheaters, one of which is used to superheat air, the other of which is used to superheat steam, the said superheaters being connected with the interior of the gas-generating chamber by two independent sets of conducting pipes and tuyeres, whereby the steam and air are kept separate throughout their entire course, substantially as described.

2. A gas-generating chamber combined with two independent sets of superheaters, one of which is used for air, the other of which is used for steam, and two independent valves, one of which admits the superheated steam to one tuyere, the other of which admits the superheated air to another tuyere, substantially as described.

3. A gas-generating chamber having in its walls two independent superheaters, one of which is used to superheat air, the other of which is used to superheat steam, the air-superheater being connected with a large tuyere, and being itself larger in diameter than the other superheater, the steam-superheater being connected with a small tuyere, and being itself smaller in size than the air-superheater, whereby pressure is kept up on the steam, and its heat is likewise maintained, thereby preventing a fall of heat, which necessarily follows from the expansion of steam, substantially as described.

4. A gas-generating chamber having in its walls two superheaters, one superheater being used to superheat steam, the other superheater being used to superheat air, the said superheaters being connected with a double tuyere, this double tuyere consisting of a small interior tube and a large exterior tube, the said double tuyere being constructed substantially as described, for the purpose of keeping up a pressure of superheated steam, while at the same time the superheated steam, being surrounded by superheated air which flows through the outer tuyere, is thereby protected from radiation.

5. A gas-generator having in its walls four sets of superheaters, which can be used alternately, one of each set being used for superheating air, the other being used for superheating steam, substantially as described.

6. A gas-generating chamber having in its walls four sets of superheaters, and four valves, controlling the passage of the gas through said superheaters, the said valves being connected by means of operating-levers, whereby the operator can from one point open or close the four valves, substantially as described.

7. In combination with air or steam superheaters, placed in the walls of a generator, a soap-stone valve or valves, controlling the air or steam passing through said superheaters, substantially as described.

ERAZM J. JERZMANOWSKI.

Witnesses:
E. N. DICKERSON, Jr.,
GEO. H. EVANS,
T. H. HARRAH.